May 23, 1950

L. W. LUBENOW 2,509,041

TUMBLING MECHANISM

Filed July 9, 1947

INVENTOR.
LEWIS W. LUBENOW
BY
Campbell, Brumbaugh & Free
ATTORNEYS.

May 23, 1950 L. W. LUBENOW 2,509,041
TUMBLING MECHANISM
Filed July 9, 1947 4 Sheets-Sheet 2

INVENTOR.
LEWIS W. LUBENOW
BY
Campbell, Brumbaugh+Free
ATTORNEYS.

May 23, 1950 L. W. LUBENOW 2,509,041
TUMBLING MECHANISM
Filed July 9, 1947 4 Sheets-Sheet 3
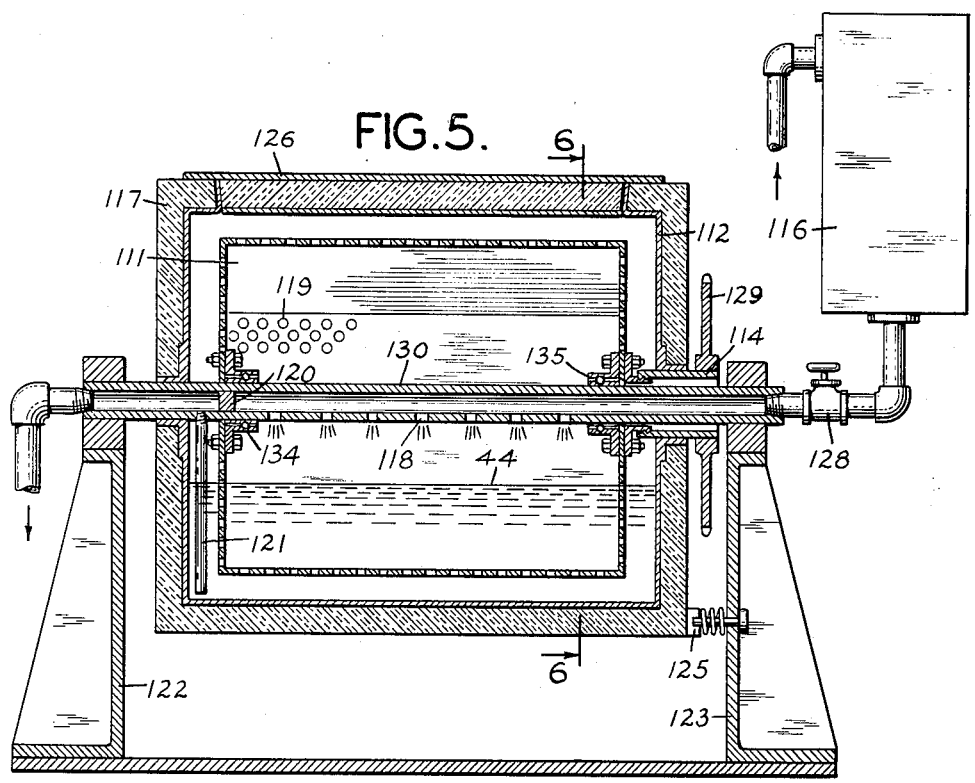
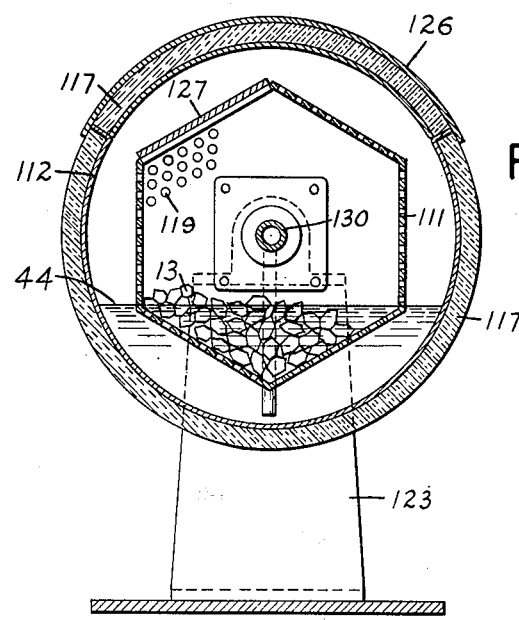
INVENTOR.
LEWIS W. LUBENOW
BY
Campbell, Brumbaugh & Free
ATTORNEYS.

May 23, 1950          L. W. LUBENOW          2,509,041
TUMBLING MECHANISM

Filed July 9, 1947          4 Sheets-Sheet 4

INVENTOR.
LEWIS W. LUBENOW
BY
Campbell, Brumbaugh & Frei
ATTORNEYS.

Patented May 23, 1950

2,509,041

UNITED STATES PATENT OFFICE 2,509,041

TUMBLING MECHANISM

Lewis W. Lubenow, Watertown, Conn.

Application July 9, 1947, Serial No. 759,886

2 Claims. (Cl. 51—164)

The present invention relates to apparatus for agitating, as by tumbling, of parts molded of soft rubber or an elastomeric material for the purpose of removing flash or fins therefrom.

This application is a continuation-in-part of my earlier abandoned application Ser. No. 680,804 filed July 1, 1946.

Soft rubber and other flexible or elastic materials may be molded into articles of many shapes such as washers, grommets, plugs, stoppers and the like. The molding is generally accomplished under heat and pressure. In order that the finished article may conform precisely to the shape of the mold, it is necessary that the mold be full. It is difficult to gauge the exact amount of the stock to be placed in the mold and for this reason a slight excess, rather than an insufficiency, is always used in order to be certain that the mold is full and that the article conforms to the shape of the mold. The excess is forced out of the mold and results in the presence of fins or extensions on the molded article which are not a part of the desired shape. These extensions are commonly known as "flash." In some instances molds are designed with a flash groove around the cavity to confine the flash to a definite pattern, and in other cases a number of small parts, such as washers, may be molded purposedly with flash connecting them together to facilitate handling during molding. In such cases, and also when the mold is made of a plurality of parts, the soft rubber may be forced into the cracks or joints between the mold parts during the molding. This is a common form of flash and is especially troublesome when the molds wear.

After the molding is completed, the flash must be removed. This is particularly difficult because of the flexible and elastic characteristics of the molded objects. Many proposals heretofore have been made for removing flash from soft molded articles but the operation is generally carried out by hand work with scissors, knives and other implements operated by hand to cut off the flash. This hand work is standard practice in the industry and adds greatly to the expense of the molded articles. It also results in irregularity in the articles due to lack of uniformity in the skill of the operators. In some cases the molded objects are fed by hand to specially designed motorized trimming machines. These machines involve a high initial expense, are expensive to operate because of the manual feeding required and generally are not universally applicable for removing flash from a variety of shapes of molded articles.

It is the principal object of the present invention to provide apparatus that is universally suitable for quickly and economically removing the flash from molded articles of various shapes and sizes.

This and other objects, as well as the advantages and the utility of the invention, will become apparent from the detailed disclosure that follows.

In general, the invention provides a perforated container, such as a tumbling barrel, so positioned within a well insulated vessel or compartment as to be at least partially immersed in an inert liquid. The inert liquid is maintained at a temperature at which the flash becomes hard and brittle so that when the molded articles in the perforated container are agitated the flash will be broken off and separated from the molded article.

Several embodiments of the invention are illustrated more particularly in the accompanying drawing wherein:

Figure 5 is a sectional elevation of another embodiment of this invention;

Figure 6 is a sectional view of the apparatus shown in Figure 5 taken along section line 6—6 looking in the direction of the arrows.

Figure 1:
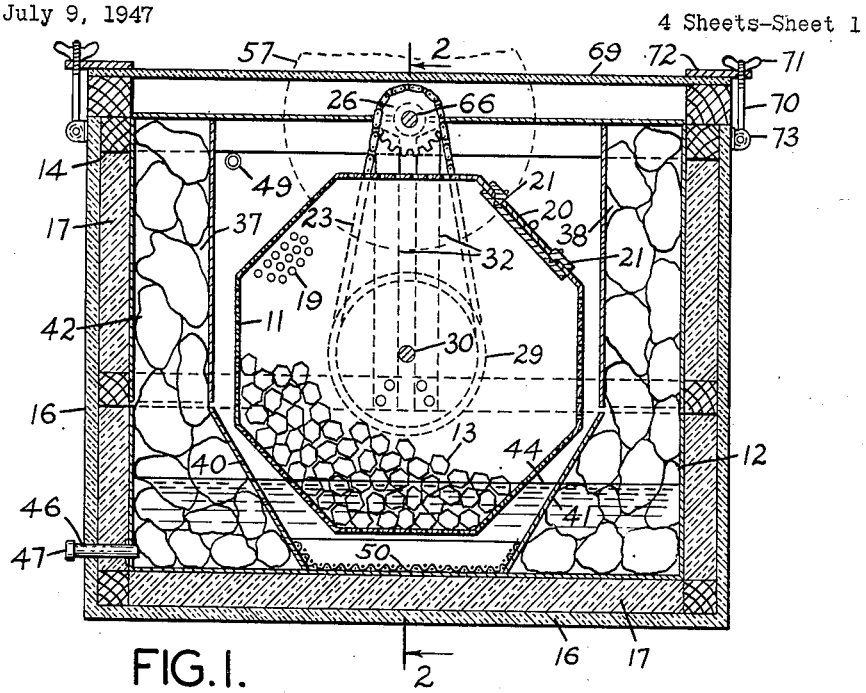
Figure 1 is a sectional elevation of one embodiment of the invention.
Figure 2:
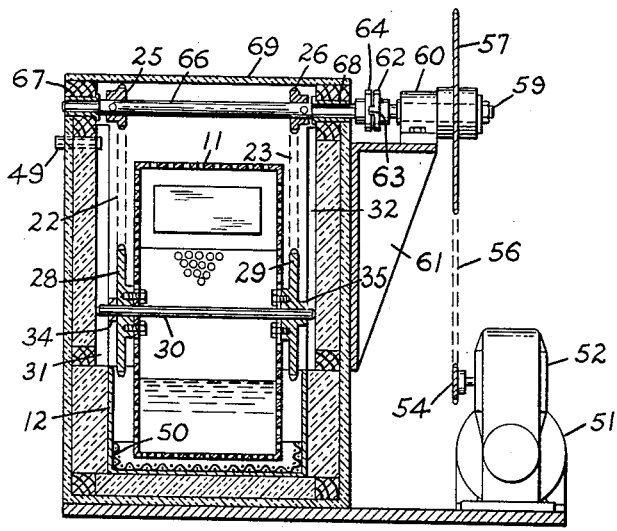
Figure 2 is a sectional view of the apparatus shown in Figure 1 along section line 2—2 looking in the direction of the arrows.

The apparatus illustrated in Figures 1 and 2 comprises a tumbling barrel 11 rotatably mounted within a vessel or tank 12 housed within a rigid frame 14 which is well insulated by means of an outside covering 16 and packed insulation 17. Tumbling barrel 11 is provided with perforations 19 in its periphery or its end walls or both and with a cover plate 20 secured by latches 21. Tumbling barrel 11 is suspended within vessel 12 by means of chains 22 and 23 supported by sprockets 25 and 26 and passing around sprockets 28 and 29 which are fastened to the end walls of tumbling barrel 11 so that rotation of sprockets 25 and 26 induces rotation of tumbling barrel 11. Tumbling barrel 11 is furthermore provided with a shaft 30 extending through its longitudinal axis and between vertical pairs of guide rails 31 and 32 mounted on frame 14 at the opposite sides so as to restrict any sideward motion of barrel 11 when the barrel is rotated. Endwise motion of barrel 11 is restricted by collars 34 and 35 mounted on shaft 30 between guide rails 31 and sprocket 28 at one end and between guide rails 32 and sprocket 29 at the other end.

Above vessel 12 there are provided guide ducts 37 and 38 and within vessel 12 perforated baffles 40 and 41 to form storage spaces and a means of gravity feed for a heat absorbing material 43 such as solid carbon dioxide (Dry Ice) to vessel 12. Vessel 12 is adapted to receive and contain an inert liquid 44 that maintains contact with heat absorbing material 42 and is free to flow into and out of tumbling barrel 11 by virtue of perforations 19 in the tumbling barrel and the perforations in baffles 40 and 41. A drain pipe 46 provided with a plug 47 is provided at the bottom of vessel 12 to allow the inert liquid to be drained when the plug is removed and a vent 49 is provided near the top of vessel 12 to allow for the removal of carbon dioxide vapors. A fine mesh screen basket 50 is provided at the bottom of vessel 12 and below the tumbling barrel 11 to collect small fragments of flash which may escape through perforations 19 in the barrel during the tumbling operation.

The mechanism for driving tumbling barrel 11 comprises a source of power such as electric motor 51 coupled directly to a reduction unit 52, the output sprocket 54 of which is connected by means of chain 56 to a sprocket 57 mounted on shaft 59. Shaft 59 is supported by means of a pillow block 60 mounted on bracket 61. At the end of shaft 59 adjacent fame 14 there is mounted a driving portion 62 of a split coupling having on its face a tongue 63 engaged with a corresponding slot in the face of driven portion 64 of said split coupling. Driven portion 64 is mounted on shaft 66 having affixed thereto sprockets 25 and 26 described previously. Shaft 66 is supported by means of two flanged sleeve bearings 67 and 68 which are split along the horizontal axis with the lower half fastened to frame 14 and the upper half fastened to cover 69. This cover may suitably be fastened to frame 14 by means of several hinged screws 70, winged nuts 71 and brackets 72 and 73.

In operation the interior of vessel 12 is maintained at a temperature sufficiently low to render the flash hard and brittle by introducing solid carbon dioxide or the like behind walls or baffles 37 and 38. Sufficient inert liquid to act as a heat transfer medium is introduced so that when the tumbling barrel 11 is in the position shown in Figure 1 it will be at least partly immersed in said liquid. The molded articles 13 to be processed are introduced into tumbling barrel 11 through the opening provided by removing cover plate 20, whereafter said cover plate is secured in position by means of latches 21 and the entire tumbling barrel assembly, including shaft 66, is lowered into position. Rotation of tumbling barrel 11 is brought about by starting motor 51 and the speed of rotation may be controlled either by varying the speed of motor 51 if it is a variable speed motor or by the relative diameters of sprockets 54 and 57. The molded articles 13 are chilled primarily by direct contact with inert liquid 44 and the heat removed from said articles is abstracted from the inert liquid by the heat abstracting substance such as solid carbon dioxide 42. The carbon dioxide vapors released by this absorption of heat are removed from vessel 12 through vent 49. The chilled flash on the molded articles becomes hard and brittle so that the tumbling action of said articles provided by rotation of tumbling barrel 11 effectively removes them from said article. When the operation is completed, shaft 66 is brought to rest so that the tongue and groove arrangement of split coupling 62, 64 is substantially vertical, the tumbling barrel assembly is lifted substantially out of vessel 12 and the molded articles and severed flash are removed therefrom by opening cover 20 and either dumping said articles from the barrel or scooping them out.

Figure 3:
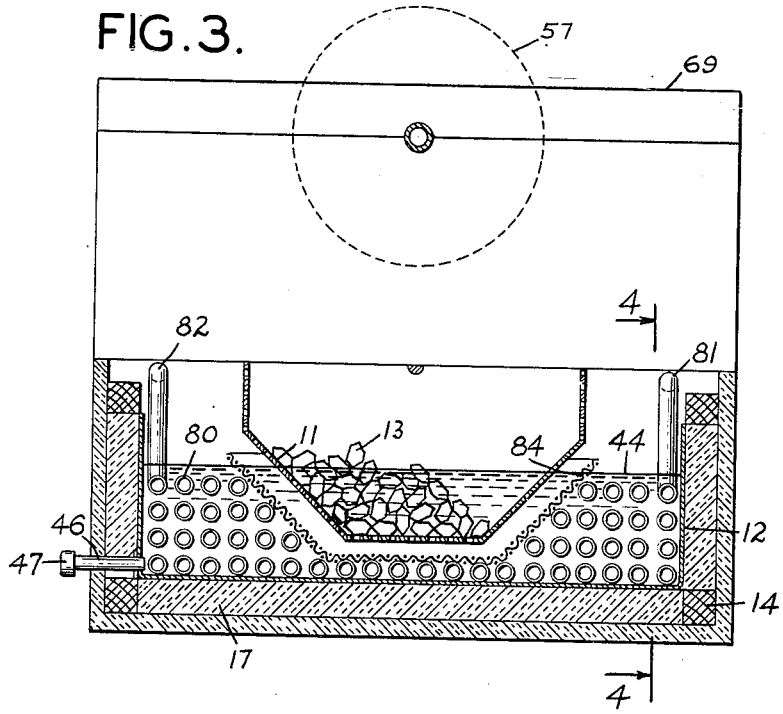
Figure 3 is a sectional elevation of a modification of the device shown in Figures 1 and 2.
Figure 4:
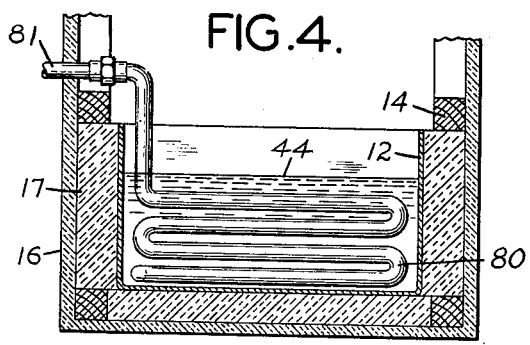
Figure 4 is a part-sectional view of the apparatus shown in Figure 3 taken along section line 4—4 looking in the direction of the arrows.

The embodiment of the invention illustrated in Figures 3 and 4 differs from the illustrated in Figures 1 and 2 primarily in the means for abstracting heat from the inert liquid that serves as a heat transfer medium. In this embodiment coils 80 are located in the lower portion of vessel 12 and preferably below the normal level of inert liquid 44. In order to abstract heat from inert liquid 44, a refrigerant is introduced by means of pipe 81, conducted through coils 80 and withdrawn from said coils by means of pipe 82. Coil 80 may be the evaporator of a refrigerating unit comprising the usual compressor and condenser or it may be a conduit for a liquid cooled by an external refrigerating means. In this modification ducts 37 and 38 and perforated baffles 40 and 41 are not required and the structure of the wire mesh basket may suitably be altered as indicated in Figure 3 by reference numeral 84. The general construction of vessel 12, frame 14, tumbling barrel 11 and the driving means for said tumbling barrel may be substantially similar to those previously described with reference to Figures 1 and 2.

The operation of the apparatus illustrated in Figures 3 and 4 is substantially the same as of apparatus illustrated in Figures 1 and 2 with the exception, of course, that vessel 12 need not be loaded with a heat abstracting material such as solid carbon dioxide but that instead the refrigerating unit be placed into operation.

It is obvious that the particular construction of the apparatus illustrated in Figures 1-4 can be modified in innumerable ways and that all such modifications are intended to be within the scope of this invention. Thus, for example, the construction of tumbling barrel 11, its method of suspension, the drive therefor, and the construction of vessel 12 can be modified considerably by the application of well known principles without departing from the spirit of this invention.

In the operation of the apparatus described in Figures 1 to 4, inclusive, it may be found desirable to provide an additional tumbling barrel assembly comprising parts 11, 20, 21, 28, 29 and 30 which can be loaded with molded articles 13 and stored in an ice box or cooling chest nearby for the purpose of prechilling the mass which is to be immersed in inert liquid 44 in vessel 12. In this manner the apparatus may be used most efficiently in that while one batch of molded articles is being tumbled the next batch can be loaded and pre-chilled so that the time required for exchanging tumbling barrel assemblies is reduced to a minimum.

The embodiment illustrated in Figures 5 and 6 of the drawing comprises a tumbling barrel 111 provided with perforations 119 which is mounted on stationary pipe or seamless tubing 130 by means of suitable bearing 134 and 135 within a rotatable, but normally stationary vessel 112 insulated against the transfer of heat by insulation 117. One end of tumbling barrel 111 is connected by means of a hollow shaft 114 disposed around and concentrically with pipe 130 and connected with a sprocket or the like 129 which may be driven by any suitable means. An inert liquid is cooled to a temperature at which the flash of molded articles becomes hard and brittle in a refrigeration unit shown diagrammatically at 116 and passes therefrom through pipe 130 to be expelled into perforated tumbling barrel 111 through perforations or refrigerant outlets 118. A plug 120 within pipe 130 blocks direct passage of the cooled inert liquid through pipe 130 beyond the end of tumbling barrel 111. The inert liquid is withdrawn from or pumped out of vessel 112 through a return pipe 121 and through pipe 130 to the left of plug 120 as shown in Figure 5 for re-cycling to a refrigeration unit 116, such as is shown in more detail in Figure 7 by the coil 234 and heat exchanger 226. Here it may be possible to also use the heat exchanger tank 220 as likewise shown in Figure 7.

The tumbling barrel and vessel assembly is supported by pipe 130 resting on support frames 122 and 123 so that vessel 112 and tumbling barrel 111 are both mounted for rotation about said pipe. In the operation of the apparatus, however, vessel 112 does not rotate but is maintained in the position shown by means of drum lock 125. Vessel 112 is also provided with an insulated cover 126.

In the operation of the apparatus illustrated in Figures 5 and 6, the molded articles to be processed are introduced to the interior of tumbling barrel 111 by opening cover 126 of vessel 112 and lid 127 of tumbling barrel 111. Lid 127 is then fastened in place on tumbling barrel 111 by any suitable means, cover 126 is placed on vessel 112, the introduction of cooled inert liquid from refrigeration unit 116 is commenced by opening valve 128, and the driving means for driving sprocket 129 and tumbling barrel 111 are set in motion. When the operation is completed, valve 128 is closed, cover 126 and lid 127 are removed, the inert liquid is evacuated from the bottom of vessel 112 through return pipe 121, and drum lock 125 is released so that the entire vessel 112 is turned upside down. By similarly turning tumbling barrel 111 so that the opening normally covered by lid 127 is in substantial registry with the opening in vessel 112, the molded articles and the separated flash are dumped out. Vessel 112 and tumbling barrel 111 are thereupon returned to their upright positions, and vessel 112 is locked in place by drum lock 125 so that the apparatus is in position to receive another load of molded articles for processing.

It is to be understood, of course, that it is within the contemplation of this invention to eliminate the rotatable feature of vessel 112 and to simply remove the molded articles and flash from the interior of tumbling barrel 111 by simply scooping them out, as well as to make any other modification based on well known principles.

Figure 7:
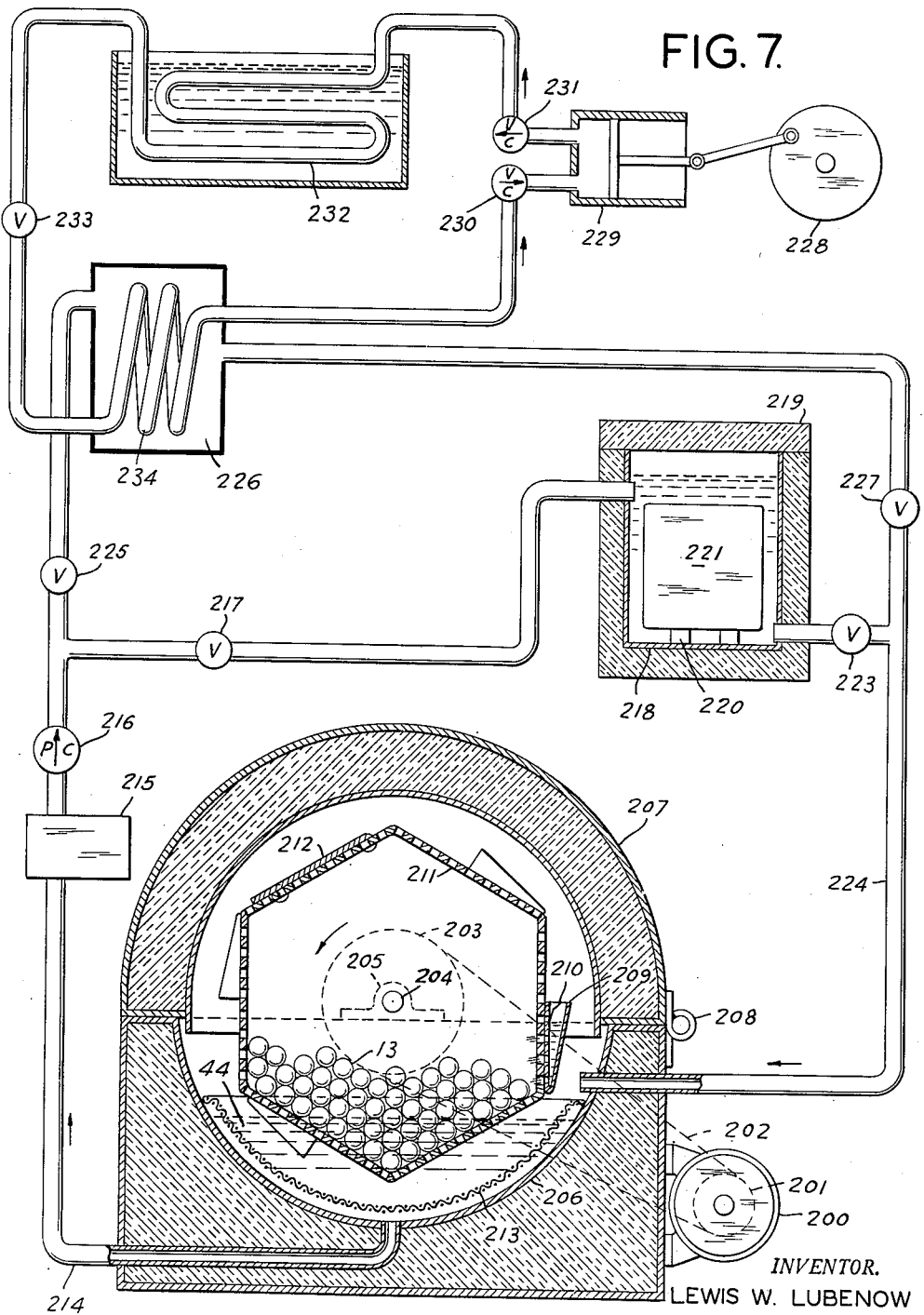
Figure 7 is a schematic view of still another embodiment of the invention.

The embodiment illustrated in Figure 7 includes a removable tumbling barrel 211 of perforated plate, wire mesh or the like having a shaft 204 that is mounted for rotation in a bearing 205 and driven by a motor 200 through a chain 202 and sprockets 201 and 203. The tumbling barrel 211 is provided with a hinged lid 212 that can be locked in a closed position by any suitable means and with a number of buckets 209 having perforations 210 in the side thereof facing the tumbling basket 211. The tumbling barrel is positioned in an insulated tank 206 having a cover 207 hinged at 208. A removable fine mesh wire basket 213 is disposed in the bottom of tank 206.

The tank 206 is further provided with a drain line 214 having a strainer 215 and a circulating pump 216. The discharge end of circulating pump 216 is connected by way of a line provided with a valve 217 to an insulated heat exchanger tank 218 provided with an insulated cover 219 and a number of space blocks 220. The lower portion of insulated heat exchanger tank 218 is provided with a discharge by way of valve 223 and line 224 which communicates with tank 206 as shown.

The discharge end of circulating pump 216 may also be connected by line provided with valve 225 to a coil type heat exchanger 226, the discharge end of which likewise communicates with tank 206 by means of a valve 227 and line 224. The heat exchanger 226 is provided with evaporating coils 234 which are part of a refrigerant circulating system comprising a check or suction service valve 230, a compressor 229 operated by a compressor motor 228, a check or discharge service valve 231, a condenser 232 and a refrigerator control valve 233.

If it is desired to operate the embodiment illustrated in Figure 7 by cooling the inert liquid 44 with solid carbon dioxide, valves 225 and 227 are closed and valves 217 and 223 are opened so that the inert liquid 44 will circulate from the bottom of tank 206 through line 214, strainer 215, circulating pump 216 and valve 217 into insulated heat exchanger tank 218. The inert liquid 44 circulates within the tank and around a block 221 of solid carbon dioxide or the like, resting on space blocks 220. The solid carbon dioxide may, if desired, be cut into slabs to increase its effective heat absorbing area. The cooled inert liquid thereupon leaves the insulated heat exchanger tank 218 and passes through valve 223 and line 224 to be reintroduced into tank 206.

If, on the other hand, the tumbling mechanism is to be operated in conjunction with a mechanical refrigerating system, valves 217 and 223 are closed and valves 225 and 227 are opened to permit the inert liquid 44 to flow through line 214, strainer 215, circulating pump 216, valve 225, heat exchanger 226, valve 227 and so back through line 224 into tank 206. Heat absorbed by the inert liquid while in the tank 206 and upon being subjected to pumping in circulating pump 216 is absorbed by a refrigerant in the coil 234 of heat exchanger 226. The refrigerant passes from coil 234 into compressor 229 by way of check valve 230 and in its compressed state passes from compressor 229 through check valve 231, condenser 232 and refrigerator control valve 233 back into coil 234.

In operating with either or both refrigerating systems, the molded articles 13 to be processed are introduced into the tumbling barrel 211 through the opening provided by opened lid 212. The lid is then closed and the tumbling barrel is rotated in the counterclockwise direction. The inert liquid in tank 206 is free to pass through the perforations in the plates or wire screening of which the tumbling barrel 211 is constructed so as to chill the flash on the molded articles so that they can be effectively removed by a tumbling operation. The circulation of the inert liquid through the tumbling barrel is augmented by the removable buckets 209 which scoop up a portion of the inert liquid, and by means of perforations 210 sprinkle it evenly onto the molded articles as the tumbling barrel rotates. Any small pieces of flash that pass through the perforations in tumbling barrel 211 are deposited upon fine mesh wire screen 213.

It is to be understood, of course, that this modification also is susceptible o innumerable changes and modifications. Thus, for example, the heat exchangers 218 and 226 are essentially duplicates and need not both be present in the same circulating system. Where mechanical refrigeration is readily available, it may be desirable to eliminate all portions of the system shown in Figure 7 between valves 217 and 223. If, on the other hand, a mechanical refrigeration system is not feasible, all of that portion of the circulating system shown between valves 225 and 227 may be eliminated. It is, of course, quite possible to retain both refrigerating systems so as to either have an alternative system available at all times or to increase the cooling capacity to a maximum by operating both systems at the same time.

It is also quite possible to change the position of the circulating pump so as to discharge the cooled inert liquid directly into the tank 207. This is not preferred, however, for the reason that the pump will add some heat to the liquid. It is also quite possible to introduce the inert liquid through the shaft of the tumbling barrel as shown, for example, in Figure 5 of the drawing instead of the manner indicated in Figure 7, in which event the cooled inert liquid is cascaded over the articles in the barrel in greater quantity. In addition, it is possible to control the level of the liquid 44 in tank 206 by any well known means such as by locating the intake opening of pipe 214 at the desired level. Furthermore, it is within the scope of this invention to attach buckets such as those shown in Figure 7 to tumbling barrels such as are shown in Figures 1, 2, 3, 5 and 6 and, in the embodiments wherein the inert liquid is cooled exteriorly of the tumbling mechanism, as shown for example in Figures 5, 6 and 7, to use either the buckets or the shaft, or both to cascade the inert liquid upon the articles in the barrel, or to rely solely upon the perforations in the barrel and its immersion in the liquid to chill the molded articles.

The invention is applicable for the removing of flash from any soft, flexible or elastic molded objects such as are made from natural rubber, balta, gutta-percha, vulcanized articles and synthetic rubbers and plastics, such as butadiene, isoprene, vinyl and acrylic polymers, and polymers that have the property of becoming hard and brittle at sub-normal temperatures. The terms "soft" and "flexible" refer to the usual properties described by these words, namely, the ability to be deformed by pressure such as can be exerted by the fingers. By the word "elastic" reference is made to the well known property of an object returning to its original shape after being deformed.

To aid in removing the flash more quickly a sufficient quantity of normally rigid articles of any suitable size and shape, such as shot and the like may be added to the charge of molded parts being tumbled.

If articles having thin wall sections such as cup shaped or tubular shaped articles are to be processed in the apparatus herein described they can be reinforced by inserting suitably formed wooden or other supporting blocks prior to their introduction into the tumbling barrel, thereby preventing breakage of parts during removal of the flash.

The term "inert liquid" is intended to include any liquid that does not freeze at the low temperatures employed in this apparatus, is inert in not permanently affecting the chemical and physical characteristics of the articles to be treated, and preferably does not corrode the apparatus. The inertness of soft rubber and other flexible and elastic materials with reference to various low freezing liquids is well known and the liquids can be selected without experimentation in view of these known properties. Methyl, ethyl, isopropyl and other lower alcohols, for example, are entirely suitable as such inert liquids. Salt brines, aliphatic hydrocarbons, chlorinated hydrocarbons and other similar organic liquids are also suitable if selected with proper precaution.

The temperatures at which the inert liquid is to be maintained within the apparatus depends upon the characteristics of the flexible or rubber-like material being processed. Some materials become hard at temperatures not too far below room temperature such as 0° F. Others are compounded so as to retain their flexibility at relatively low temperatures to resist cold climates and atmospheric conditions at high altitudes. For economic reasons, the temperature of inert liquid in the apparatus is not maintained at a temperature lower than that necessary to cause the molded article to be hard enough to have the flash removed. Furthermore, the temperature must not be so low as to cause the material to become so brittle that the article itself is broken. The temperature selected can be readily determined without experimentation from the known or ascertainable properties of the molded article to be processed. For most of the molded soft rubber (natural and synthetic) articles which are encountered in commerce, temperatures between about −25° to about −85° F. are entirely satisfactory.

In the apparatus illustrated in Figures 1 and 2, the temperature of the inert liquid can be regulated sufficiently by regulating the amount of heat abstracting substance such as solid carbon dioxide in the vessel. In the apparatus illustrated in Figures 3 to 7 inclusive, the temperature of the inert liquid can be regulated by regulating the flow of either the refrigerating medium in the coils or by regulating the flow of inert liquid through the cooling means.

It is to be understood that any suitable means or device for cooling the inert liquid with which the molded articles in the tumbling barrel come in contact are included within the scope of this invention. Furthermore, it is to be understood that the container in which the molded articles are processed need not necessarily be a rotating tumbling barrel but that it may be any container which can be rocked, shaken or vibrated so that the molded articles within it will be agitated sufficiently to cause the breaking off of flash and which is suitably perforated to allow passage therethrough of the cooled inert liquid.

It is obvious that numerous other variations in the construction and operation of the apparatus specifically described herein may be made and it is to be understood that such of those that come within the spirit of this invention are included within the scope thereof if within the following claims.

I claim:

1. A tumbling mechanism comprising an insulated vessel for containing a liquid, a perforated tumbling barrel mounted for rotation therein and adapted to be immersed at least partly within said liquid, and a bucket attached to an exterior surface of said tumbling barrel, said bucket being provided with perforations in the side adjacent said exterior surface to cascade said liquid over the articles in said barrel when the latter is rotated.

2. Apparatus for removing flash from articles molded from normally soft and elastic material which comprises an insulated vessel for containing an inert liquid, a perforated container for said articles mounted for rotation in said vessel and adapted to be immersed at least partly in said liquid, means for cooling said inert liquid to a temperature at which the flash becomes hard and brittle, a circulating system including at least one perforated bucket attached to an exterior surface of said container for circulating said cooled liquid from said cooling means, into contact with the articles in said container and back to said cooling means, and means for rotating said perforated container to agitate the articles therein and to sprinkle them with inert liquid discharged from said buckets after immersion of said buckets in said inert liquid.

LEWIS W. LUBENOW.

REFERENCES CITED

The following references are of record in the file of this patent:

UNITED STATES PATENTS

| Number | Name | Date |
|---|---|---|
| 713,379 | Barton | Nov. 11, 1902 |
| 1,824,814 | Frine | Sept. 29, 1931 |
| 2,182,952 | Todd et al. | Dec. 12, 1939 |
| 2,347,464 | Cuno | Apr. 25, 1944 |
| 2,380,653 | Kopplin | July 31, 1945 |

FOREIGN PATENTS

| Number | Country | Date |
|---|---|---|
| 221,090 | Germany | Apr. 19, 1910 |
| 524,519 | Great Britain | Aug. 8, 1940 |